(12) United States Patent
Lucidarme (10) Patent No.: US 11,465,516 B2
(45) Date of Patent: Oct. 11, 2022

(54) DEVICE FOR MANAGING AN ELECTRIC PROPULSION ASSEMBLY OF A VEHICLE

(71) Applicant: ELECTRICITE DE FRANCE, Paris (FR)

(72) Inventor: Thierry Lucidarme, Chevreuse (FR)

(73) Assignee: ELECTRICITE DE FRANCE, Paris (FR)

( * ) Notice: Subject to any disclaimer, the term of this patent is extended or adjusted under 35 U.S.C. 154(b) by 295 days.

(21) Appl. No.: 16/618,746

(22) PCT Filed: Apr. 19, 2018

(86) PCT No.: PCT/EP2018/059982
§ 371 (c)(1),
(2) Date: Dec. 2, 2019

(87) PCT Pub. No.: WO2018/219552
PCT Pub. Date: Dec. 6, 2018

(65) Prior Publication Data
US 2020/0164765 A1 May 28, 2020

(30) Foreign Application Priority Data

May 31, 2017 (FR) ....................................... 1754791

(51) Int. Cl.
*B60L 53/00* (2019.01)
*B60L 58/12* (2019.01)
*B62M 6/45* (2010.01)

(52) U.S. Cl.
CPC ............... *B60L 53/00* (2019.02); *B60L 58/12* (2019.02); *B60L 2200/12* (2013.01);
(Continued)

(58) Field of Classification Search
CPC ...... B60L 53/00; B60L 58/12; B60L 2200/12; B60L 2240/62; B60L 2240/642;
(Continued)

(56) References Cited

U.S. PATENT DOCUMENTS 5,878,831 A * 3/1999 Saito ....................... B60L 58/21
180/206.2
2008/0262668 A1 10/2008 Yamada
(Continued)

FOREIGN PATENT DOCUMENTS

WO 2012/172227 A1 12/2012

OTHER PUBLICATIONS

International Search Reported (ISR), dated Jun. 22, 2018, from corresponding international application No. PCT/EP2018/059982.

*Primary Examiner* — Alan D Hutchinson
(74) *Attorney, Agent, or Firm* — Nixon & Vanderhye (57) ABSTRACT

Disclosed is a management device suitable for managing an electric propulsion assembly of a vehicle. The management device includes: a communication interface suitable for receiving an elevation profile for a predetermined route that the vehicle is intended to take; and a determination module configured to determine, based on the elevation profile, for each of one or more points of the route, a maximum electric power that the electrical energy storage device is configured to supply to the motor at the corresponding point. The management device is further configured to interact with the electric propulsion assembly such that, for each point of the route for which the maximum electric power is determined, the electric power actually supplied by the electrical energy storage device to the motor is less than the corresponding maximum electric power.

18 Claims, 2 Drawing Sheets

(52) U.S. Cl.
CPC ..... *B60L 2240/62* (2013.01); *B60L 2240/642* (2013.01); *B60L 2260/52* (2013.01); *B60L 2260/54* (2013.01); *B62M 6/45* (2013.01)

(58) Field of Classification Search
CPC ... B60L 2260/52; B60L 2260/54; B62M 6/45; Y02T 10/70; Y02T 10/7072; Y02T 10/72; Y02T 90/16; Y02T 90/14
See application file for complete search history.

(56) References Cited

U.S. PATENT DOCUMENTS

| | | | |
|---|---|---|---|
| 2014/0229046 A1* | 8/2014 | Gros | ........................ B60L 50/20 701/22 |
| 2015/0158397 A1 | 6/2015 | Soto et al. | |
| 2016/0167641 A1 | 6/2016 | Yoon | |
| 2016/0243958 A1 | 8/2016 | Miller et al. | |

* cited by examiner

DEVICE FOR MANAGING AN ELECTRIC PROPULSION ASSEMBLY OF A VEHICLE

BACKGROUND OF THE INVENTION

Field of the Invention

The invention relates to the field of managing electric vehicle propulsion assemblies via which the propulsion of the corresponding vehicle is at least partly provided.

The invention finds a preferred application in the field of the propulsion of bicycles having such a propulsion assembly, although it is not limited to this and may in particular be implemented in the context of another vehicle, particularly an automobile.

Description of the Related Art

In the field of vehicles propelled at least partly with electricity, it is desirable to prevent situations in which the user employs the electrical energy storage device comprised in die electric propulsion assembly of his or her vehicle, in such a manner that it runs out of power when the vehicle is not near a charging point.

For example, the main approach to these considerations and aiming to solve this problem, particularly in the automotive field, is to inform the user of the remaining range of the vehicle so that the user can take steps to reach a charging point without depleting the batteries.

This approach is not entirely satisfactory, since it requires the user to regularly monitor the range of the propulsion assembly and to adjust his or her behavior accordingly. This type of approach also tends to distract the user from the actual controlling of the vehicle by requiring the user to focus on something other than the road being followed.

SUMMARY OF THE INVENTION

The invention aims to improve the situation.

To this end, the invention relates to a management device suitable for managing an electric propulsion assembly of a vehicle, the electric propulsion assembly comprising an electrical energy storage device and a motor suitable for propelling said vehicle entirely or partially using electrical energy stored in the electrical energy storage device, the management device comprising:

- a communication interface suitable for receiving an elevation profile for a predetermined route that the vehicle is intended to take,
- a determination module configured to determine, based on said elevation profile, for each of one or more points of said route, a maximum electric power that the electrical energy storage device is configured to supply to the motor at the corresponding point, and
- the management device being further configured to interact with the electric propulsion assembly such that, for each point of the route for which said maximum electric power is determined, the electric power actually supplied by the electrical energy storage device to the motor is less than the corresponding maximum electric power.

According to one aspect of the invention, the determination module is configured to divide the route into segments based on the elevation profile, each segment being associated with a maximum electric power.

According to one aspect of the invention, for a given segment, the associated maximum electric power is representative of the electrical energy available for the segment, the management device being configured to interact with the electric propulsion assembly such that the electrical energy actually supplied to the motor in a segment by the electrical energy storage device is greater than or equal to a predetermined traction of the electrical energy available for the segment.

According to one aspect of die invention, in order to determine the maximum electric power for one or more segments of said route, the determination module is configured to:

- divide the route into said segments based on the elevation profile,
- determine, for each of the obtained segments and from the elevation profile, a type of segment among: a climbing segment, a descending segment, a flat segment,
- define for the route an energy budget chosen according to the electrical energy storage device, and define for each segment a portion of the energy budget,
- as long as the value of a combination of terms respectively associated with one of the segments and each corresponding to a product of the energy budget portion for the segment and a factor chosen according to the type of the associated segment, recalculate the value of said combination for each of one or more iterations between each of which the energy budget portion for each segment is reduced by a predetermined value relative to the previous iteration, until the value of the combination is less than or equal to the energy budget, and
- determine the maximum electric power of at least one segment, based on the product of the energy budget portion and the factor chosen for the segment that provided the value of the combination less than or equal to the energy budget.

According to one aspect of the invention, the determination module is configured to determine the maximum electric power of at least one segment based on the ratio between: an electrical energy corresponding to the product of the energy budget portion and the factor chosen for the segment providing the value of the combination less than or equal to the energy budget, and an estimate of the time needed for the vehicle to travel all or part of the corresponding segment.

According to one aspect of the invention, the determination module is configured to determine the estimate from at least one vehicle speed information item provided by a positioning module comprised in the management device or with which the management device is configured to communicate via the communication interface.

According to one aspect of the invention, the determination module is configured to select the factor for a climbing or descending segment from at least two distinct values corresponding to different respective levels of elevation changes.

According to one aspect of the invention, the type of a segment is determined based on the difference between the altitude of a starting point of the segment and the altitude of an end point of the segment.

According to one aspect of the invention, the determination module is configured to divide the route into segments having respective monotonic elevation profiles.

According to one aspect of the invention, the energy budget portions respectively associated with the segments are identical between segments.

According to one aspect of the invention, the energy budget portion associated with a segment is determined from a length of the segment relative to a length of the route.

According to one aspect of the invention, the device further composes a memory configured to store for said route the maximum electric powers determined by the determination module, the determination module being configured to reuse all or part of the maximum electric powers contained in the memory for one or more segments of said route for a subsequent trip by the vehicle on said route.

According to one aspect of the invention, said management device is integrated with a portable electronic device such as a smart phone.

The invention further relates to a method for managing an electric propulsion assembly of a vehicle, the electric propulsion assembly comprising an electrical energy storage device and a motor suitable for propelling said vehicle entirely or partially using electrical energy stored in the electrical energy storage device, the method being implemented by computer means and comprising:

receiving an elevation profile for a predetermined route that the vehicle is intended to take, determining, based on said elevation profile, for each of one or more points of said route, a maximum electric power that the electrical energy storage device is configured to supply to the motor at the associated point, and interacting with the electric propulsion assembly such that, for each point of the route for which said maximum electric power is determined, the electric power actually supplied by the electrical energy storage device to the motor is less than the corresponding maximum electric power.

The invention further relates to a computer program comprising instructions for implementing the method as defined above, when this program is executed by a processor.

BRIEF DESCRIPTION OF THE DRAWINGS

The invention will be better understood by reading the detailed description which follows, given solely as an example and with reference to the appended figures, in which.

DESCRIPTION OF THE PREFERRED EMBODIMENTS

Figure 1:
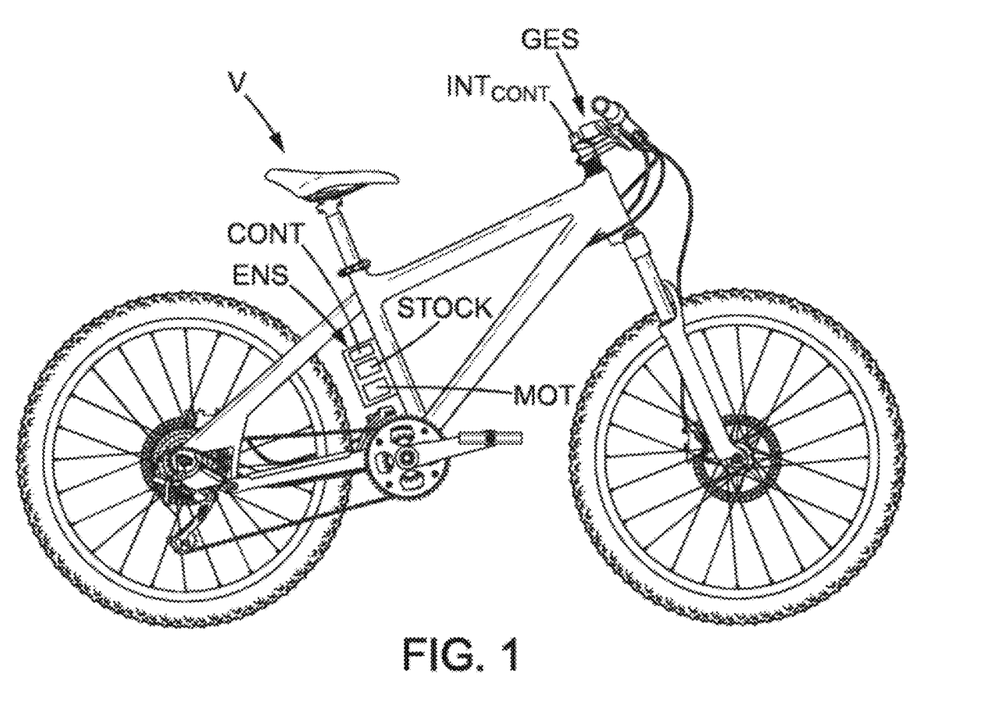
FIG. 1 illustrates a vehicle with propulsion that is at least partly electrical and a management device according to die invention.

FIG. 1 illustrates a vehicle V with propulsion that is at least partly electrical and a management device GES according to the invention, hereinafter the device GES.

In what follows, the vehicle V is illustrated in a non-limiting manner in a configuration which concerns a bicycle. Alternatively, it is a vehicle of some kind. For example, in one configuration, it is an electric car.

The vehicle V, which is a bicycle V in the following, comprises one or more wheels intended to be set in motion by a mechanical force generated by a user, typically applied to the wheels via a pedal and a chain coupled to the pedal.

The vehicle V further comprises an electric propulsion assembly ENS adapted to propel the vehicle V by means of electrical energy.

In practice, the movement of the vehicle V is caused by mechanical force from the user and/or the assembly ENS.

The assembly ENS is arranged on the bicycle V, for example by attachment to a structure thereof, such as a frame that it comprises.

The assembly ENS comprises a storage device STOCK configured to store electric power, and a motor MOT coupled to die storage device STOCK and configured to be supplied electric power by it in order to drive the movement of the bicycle V.

The storage device STOCK advantageously comprises a battery, such as an electrochemical battery. For example, this battery is a lead-acid or lithium battery.

The storage device STOCK is adapted to be recharged with electrical energy at least by connecting it to an external power source, such as a power grid.

Advantageously, the storage device STOCK is also adapted to store electrical energy that comes from braking the vehicle, for example via any known means such as a braking energy recovery device (not shown).

The motor MOT is advantageously a motor with rotor and stator that are movable relative to each other.

Advantageously, the motor MOT is synchronous and brushless. This type of motor is known as brushless.

The motor MOT is configured to propel the bicycle V, for example by action on the pedal and/or chain of the bicycle. This action is for example implemented via a transmission means not shown, including for example a shaft coupled to the motor.

The assembly ENS further comprises a control module CONT adapted to control the storage device STOCK in order to provide electrical energy to the motor MOT so as to regulate the propulsion provided by the assembly ENS, and a control interface $INT_{CONT}$ connected to the control module CONT, enabling the user to control the assembly ENS.

The control module CONT is configured to control the storage device STOCK so that the storage device STOCK supplies regulated electrical energy to the motor MOT in a manner that regulates the mechanical power supplied by the motor MOT.

For example, the regulation employed is current regulation with a substantially constant voltage provided by the storage device STOCK. In other words, the control module CONT is adapted to vary the current supplied by the storage device STOCK to the motor MOT at substantially constant voltage.

Additionally or alternatively, the control module CONT is adapted to regulate the electrical energy supplied by the device STOCK by varying the voltage it supplies to the motor MOT.

The control module CONT is for example of known make.

It comprises for example one or more discrete electronic components. Alternatively, it comprises a circuit board adapted to implement the functions of the control module CONT.

The control interface $INT_{CONT}$ is configured for entry by the user of commands defining the behavior of the assembly ENS.

For example, this interface is suitable for entering at least a start command and a stop command for the assembly.

Advantageously, it is also suitable for entering a command to regulate the propulsion force generated by the assembly ENS.

For example, this command is representative of the user's selection of one of several possible propulsion levels. These levels are, for example, discrete.

For this purpose, the control interface $INT_{CONTR}$ comprises for example one or more buttons associated with one or more possible commands.

Optionally, the control interface $INT_{CONTR}$ comprises a display, optionally coupled to the buttons in order to define a touch interface.

It should be noted that the control module CONT, the motor MOT, and the storage device STOCK are for example arranged within a housing, and the control interface $INT_{CONT}$ is at a distance from this housing. The interlace is for example at the bicycle handlebars.

This configuration is illustrative, however. For example, the motor MOT, the control module CONT, and the storage device STOCK may be distanced from one another. As another example, the storage module STOCK, which is likely to occupy a relatively large volume, is at a distance from the motor MOT and control module CONT. The control module is advantageously adjacent to the motor. Alternatively, it is at a distance from the motor.

Figure 2:
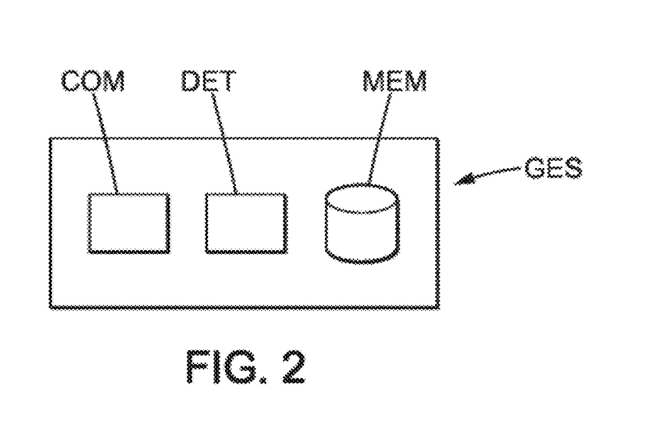
FIG. 2 illustrates the management device according to the invention.

Referring to FIG. 2, the device GES according to the invention is configured to interact with the assembly ENS in order to regulate the propulsion provided by the assembly ENS.

More specifically, the device GES is configured to determine and provide to the assembly ENS, for each of one or more respective points of a route T (FIG. 3), a maximum electric power defining an electric power maximum that the storage device STOCK supplies to the motor MOT while traveling the considered point of the route T.

Advantageously, and its described below, each maximum electric power is defined for a segment Si (FIG. 3) formed by a plurality of such points. This power is constant over a given segment, or is variable.

Figure 3:
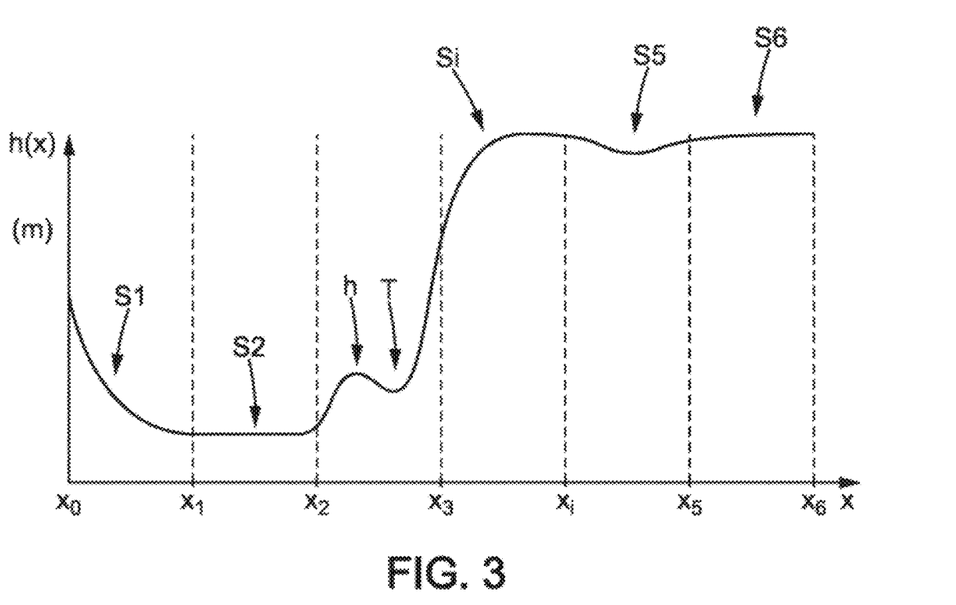
FIG. 3 illustrates an elevation profile.

Advantageously, the device GES is further configured to interact with the assembly ENS so that the electric power actually supplied by the storage device STOCK to the motor MOT while traveling the segment is greater than or equal to a predetermined fraction of the maximum electric power associated with this segment.

The details of these features are given below.

In FIG. 1, the management device GES is illustrated as being at a distance from the assembly ENS. However, alternatively, the management module GES is housed in a housing comprising one or more elements of the assembly ENS, or all elements of the assembly ENS.

For example, the management device GES may be integrated into the control interface $INT_{CONT}$, or with a housing comprising the control module CONT, the storage device STOCK, and/or the motor MOT.

Note that optionally it is the control interface $INT_{CONT}$ that may be integrated into the management device GES.

Referring again to FIG. 2, the management device GES comprises a communication interface COM, a determination module DET, and a memory MEM.

The communication interface COM is configured to allow communications of the management device GES at least in order for the management device to receive an elevation profile h for the route T.

The elevation profile h is illustrated in FIG. 3, and is representative e of the variation in altitude of the various points of the route T.

The elevation profile h advantageously corresponds to an altimetric plot of the route.

The profile h represents the different points of the route T: the abscissae of the elevation profile, which are advantageously curvilinear abscissae, represent the distance separating the abscissa considered from the beginning of the route T, and the ordinates represent the altitude of these different points.

Optionally, in particular depending on the distribution of the elements of the device GES and of the assembly ENS on the bicycle V, the communication interface COM is provided for communication of the device GES and assembly ENS.

The communication interface COM is suitable for communications according to one or more known communication technologies, advantageously wireless. For example, it is suitable for communications using Bluetooth, WiFi, radiofrequency, etc. In some embodiments, this interface is suitable for communications of the device GES with an electronic device such as a smart mobile phone.

The memory MEM is configured to store one or more programs which, when executed by the determination module, allow the operation of the device GES.

The memory MEM is also advantageously configured to store the elevation profile h, as well as the data used in the processing (described below) carried out m order to determine the maximum electric power and at the end thereof. Advantageously, it is configured to store the maximum powers determined for a given route T, the determination module DET being configured to reuse these data during a subsequent traveling of this route by the vehicle.

Advantageously, the memory MEM also contains configuration data used during the processing and defining processing procedures. This configuration data is for example modifiable by the user, for example via a human-machine interface of the management device GES (not shown), via the control interface $INT_{CONT}$ or via the communication interface COM.

The determination module DET forms a processing module of the management device GES.

In the context of the invention, more specifically it forms a computer processing means used for the management of the assembly ENS within the meaning of the invention.

Advantageously, the determination module DET comprises a processor, a microcontroller, or a programmable integrated circuit. For example, such a programmable integrated circuit includes or is formed by an array of programmable gates known by the acronym FPGA ("Field Programmable Gate Array") or the like.

The determination module DET is configured to determine the maximum electric powers described above. This determination is detailed below in the context of the management method according to the invention.

Figure 4:
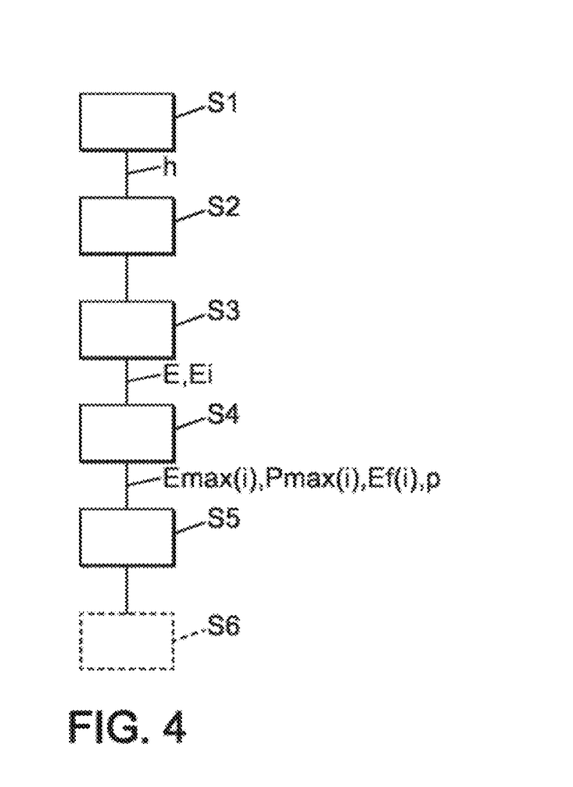
FIG. 4 illustrates a management method according to the invention.

A management method according to the invention will now be described with reference to the figures, particularly FIG. 4.

During a first step S1, the management device GES receives, via the communication interface COM, the elevation profile h for the route T that the bicycle is intended to travel.

In one embodiment the elevation profile h is provided by a portable electronic device, for example belonging to the user of the bicycle V. This device corresponds tor example to a smart phone, a smart tablet, or a personal computer.

In a known manner, there are existing programs for generating such elevation profiles from topographical data in which the route T has been defined, and adapted to be executed on this type of electronic device.

In another embodiment, the elevation profile is provided by a communication network such as a data network to which the management device GES has access via the communication interface COM.

Note that this receiving is advantageously triggered by means of a request from the user, for example input via the device GES or the above separate portable electronic device.

In a second step S2, the determination module DET processes the elevation profile h.

More specifically, the determination module DET divides the route into a plurality of segments Si. These segments are consecutive and together cover the entire route T.

In one embodiment, this division is made so as to obtain segments having a constant size.

To do this, for example, the abscissa of the end point of the route is divided by a chosen number corresponding to the number N of segments of the route T. Each segment covers a range of abscissae corresponding to the result obtained, the first segment starting from the starting point of the route.

The value of N and/or its maximum value are for example predetermined. These values are for example chosen according to the computing power of the management device GES.

Advantageously, N is greater than or equal to 2. Advantageously, N is greater than or equal to 5. In FIG. 3, N is equal to 6.

In another embodiment, the route T is divided into segments so that the segments have a monotonic elevation. In other words, within a segment, the route T climbs and/or is flat, or descends and/or is flat. In this configuration, it is the configuration of the route T which defines the number N.

For this division of the route into monotonic segments, for example, the determination module DET employs one or more methods for studying known extremums in order to define the segment beginnings and endings.

For example, in the context of this method, the determination module analyzes the first and second derivatives of the elevation profile at any point thereof.

In addition, the determination module DET determines the type of each segment Si obtained, among a climbing segment, a descending segment, and a flat segment.

For example, for this purpose, for each segment, the determination module DET takes the difference between the altitude of the route at the end of the segment, and the altitude at the beginning of the route segment.

If the result is positive, the segment is considered to be climbing. If the result is negative, the segment is considered to be descending. If the result is zero, the segment is considered to be flat.

During a step S3, an energy budget E is defined for the route. This budget is chosen on the basis of the storage device STOCK.

For example, it is defined as a fraction of the electrical energy currently stored in the storage device. Advantageously, this fraction is taken as equal to 100%.

Alternatively, the budget E is defined as a fraction of the maximum electrical energy that the storage device STOCK can hold. Advantageously, this fraction is taken as equal to 100%.

Note that these definitions mean the same thing when the storage device STOCK is at its maximum charge level.

In other words, the budget E is constructed to represent an amount of electrical energy expressed as a fraction of a reference amount of electrical energy of the storage device STOCK.

The amount of energy in question is known, for example via the specifications of the storage device STOCK.

This definition is implemented by the determination device DET, for example on the basis of the configuration data.

In addition, during this step, each segment Si is assigned a respective portion of the energy budget E, denoted E(i) for segment Si.

In one embodiment, this portion E(i) is taken as identical for each segment. This is advantageously the case when the segments are of constant size.

The portion for a segment is for example equal to E/N, where N is the number of segments Si of the route T.

In another embodiment, the portion E(i) for a segment Si is determined based on the length of the segment Si relative to the length of the route T. This is advantageously the case for segments with monotonic elevation changes.

Advantageously, the portion E(i) is taken as equal to $$E(i) = \frac{\Delta_i}{\Delta} * E,$$

with $\Delta_i = x_i - x_{i-1}$ and $\Delta = x_n - x_0$, where $x_0$, $x_{i-1}$, $x_i$ and $x_n$ are the respective abscissas of the starting point of the route T (and of the first segment S1), the starting point of segment Si, the end point of segment Si. and the end point of the route T (and of segment SN) within the elevation profile h.

During a step S4, via the determination device DET, an iterative approach is carried out in order to determine the maximum electric powers of the different segments by considering the value of a combination of terms respectively associated with one of the segments and each corresponding to a product of the energy budget portion E(i) and a factor $K_i$ chosen according to the type of the associated segment. Each iteration results in the determination of the value of this combination, the energy budget portion allocated to the segments of a given iteration being reduced by a predetermined value relative to the previous iteration. The iterations are conducted until a combination is obtained having a value less than or equal to the budget E.

The reduction in the value applied to the budget portion for segment Si from one iteration to another is denoted $\Delta E(i)$.

Advantageously, $\Delta E(i)$ is identical for all iterations.

In certain embodiments, advantageously those in which the segments are of constant size, $\Delta E(i)$ is taken as identical for the different segments, and is equal to a chosen value denoted $\Delta E$.

Alternatively, in certain embodiments, for example those with monotonic segments, the various $\Delta E(i)$ in principle are different from one segment to another.

Advantageously, in this configuration, $\Delta E(i)$ is taken as equal to $$\frac{\Delta_i}{\Delta} * \Delta E,$$

where $\Delta E$ is predetermined.

Regardless of which configuration is considered, $\Delta E$ is for example equal to one or several units of the budget E. For example, for a budget E of 100, $\Delta E$ is taken as equal to 1, 2 or 3. Note that $\Delta E$ is not necessarily an integer, although this is preferred.

The combination employed is advantageously a linear combination.

In other words, it is in the form $\Sigma_{i=1}^n K_i \cdot Ep(i)$.

The factors $K_i$ are preferably positive.

For climbing and descending segments, the factors Ki are advantageously chosen among at least two possible values corresponding to different levels of elevation changes.

For a climbing segment, Ki is greater than 1, and is larger the greater the change in elevation of the segment. For a descending segment, Ki is advantageously less than 1, and draws closer to zero the greater the change in elevation of the segment.

For example, for a climbing segment, the possible values are 2 and 3. For a descending segment, for example, they are ½ and ⅓.

For example, each possible value for a factor is associated with a range of elevation changes, and the membership of the elevation change of a segment in one of these ranges is determined by the determination module in order to determine the corresponding factor.

Note that in order for the initial iteration not to directly provide a combination value lower than E, for climbing segments it is preferable to take possible values of Ki that are sufficiently far from 1. In addition, the invention is particularly suitable for routes having a high proportion of climbing segments.

Advantageously, the coefficients of the climbing segments am chosen among values greater than or equal to 2.

The possible values for the factors are, for example, part of the configuration data. Note that the possible values are advantageously adjustable by the user, for example via the human-machine interface of the management module. Thus, he or she can adjust the degree of assistance provided by the assembly ENS on the climbing and descending segments.

Note that if during an iteration, the budget portion allocated to a segment becomes negative because of its decrement relative to the previous iteration, it is considered to have a value of zero for the determination of the combination value.

Once the combination providing a value less than or equal to E is obtained, for each segment, the associated maximum electric power is determined based on the product of the energy budget portion E(i) and the factor Ki chosen for the segment and having provided the combination value less than or equal to the energy budget E.

The product in question represents the fraction of the budget E allocated to the segment considered for traveling the route, after the iterative process.

In order to determine the maximum electric power, the determination module DET determines the amount of electrical energy which this fraction of the budget E corresponds to, based on the amount of electrical energy corresponding to the budget E. This amount of electrical energy is known by the definition of the budget E.

The fraction in question corresponds to a maximum amount of electrical energy Emax(i) allocated to the segment.

The processing is immediate, for example via an operation of multiplying the fraction in question by the amount of energy corresponding to the budget E.

The maximum electric power Pmax(i) is then determined, based on the amount Emax(i) and an estimate of the travel time for all or part of the corresponding segment Si.

In one embodiment, the estimate is for example made initially, in other words before the bicycle V travels the segment.

In this embodiment, the estimate is for example based on the length of the segment and an estimated average speed of the vehicle in the segment.

This average speed is for example estimated based on the knowledge of elevation changes in the segment and the operational data collected for the bicycle, for example by the assembly ENS or the device GES itself, on previous trips. These data include for example time data representative of the time taken to travel the segments of a different route but of the same type, and advantageously having been assigned the same factor Ki.

Note that the estimate of the average speed is made according to known procedures for example.

By performing a simple ratio between the length of the segment and this estimated average speed, an estimate of the time spent in the entire segment is achieved.

In this configuration, the maximum electric power Pmax(i) is constant in the segment.

In another configuration, the electric power Pmax(i) is determined in real time based on positioning data.

These positioning data are for example obtained by the device GES via a positioning module that it comprises.

Alternatively, they are provided to the device GES by a device to which the device GES is connected, such as a portable electronic device available to the user and including a positioning module, such as a smart phone. This device is advantageously the device dial provided the profile h (when obtained in this manner).

Regardless of the configuration, the positioning module is advantageously a GNSS module, for "Global Navigation Satellite System". The module is for example a GPS module, for "Global Positioning System", or a GALILEO module.

The device GES associated with this device forms for example a management system according to the invention.

These data advantageously include the location of the vehicle in the route, in other words the abscissa of the current point in the elevation profile, as well as the current speed of the bicycle.

In order to determine the maximum electric power Pmax(i), the determination module DET estimates the time to travel the remainder of the current segment based on the positioning data, in other words the estimated time that the bicycle will take in order to reach tire end of the segment from the current point of the segment.

To do this, the determination module generates the estimate based on the location of the bicycle, of the end of the segment, and its current speed, for example in a known manner.

The determination module DET then determines the current maximum electric power from the energy Emax(i) of the segment, the energy denoted Ef(i) representing the electrical energy already supplied by the storage device STOCK to the motor MOT in the segment, and the estimate of the time to travel the rest of the segment.

For example, it determines this as the ratio between the difference between these electric energies (in other words Emax(i)−Ef(i)) and the estimate in question.

The energy Ef(i) is advantageously recorded by the management device GES over time.

Note that the power Pmax(i) thus in principle becomes variable over time.

This determination of the maximum electric power Pmax(i) is for example repeated, advantageously at regular intervals.

During a step S5, the management device GES supplies the assembly ENS the maximum power Pmax(i) for use by the control module CONT.

The power Pmax(i) is for example sent as soon as it is determined.

Once received, the power Pmax(i) is implemented in the corresponding segment.

It should be noted that, optionally, the power Pmax (i) is received together with data characterizing the conditions of its use, for example in terms of location within the route or when to implement.

Alternatively, however, the power Pmax(i) is implemented upon receipt.

For effective implementation of the power Pmax(i), the control module CONT determines the electric power actually supplied to the motor MOT at a given moment so that this power is less than or equal to the power Pmax(i) which applies to the current segment or to the current portion of the segment.

As indicated above, this power is advantageously determined from information entered by the user via the control interface $INT_{CONT}$, the power Pmax(i) then being taken into account and forming an upper bound for the result of the determination.

During an optional step S6, the management device GES interacts with the assembly ENS so that die electrical energy actually supplied to the motor in a segment by the electrical energy storage device is greater than or equal to a predetermined fraction of the electrical energy allocated to the segment after the iterative process.

In other words, the management device GES interacts with the assembly ENS so that the electrical energy actually expended by the motor MOT to propel the bicycle in the segment is greater than a fraction p of the maximum energy Emax(i) allocated to this segment.

This fraction is for example chosen to be greater than or equal to 0.5, 0.6, 0.7, or 0.8.

Advantageously, this fraction is modifiable by the user, for example via the human-machine interface of the management module GES, or else via the interface $INT_{CONT}$. Each above value corresponds for example to a possible setting accessible to the user.

Advantageously, in this configuration, the minimum electric power corresponding to the product p*Pmax(i) is determined, for example via the determination module DET or the assembly ENS.

The control module CONT then determines the electric power actually supplied by the storage device STOCK using this minimum electric power as the lower bound.

Note, however, that it is possible for this minimum electric power not to be used, for example temporarily, in case of detection of one or more predetermined conditions. For example, such a condition or one such condition relates to the detection of a braking action implemented in the vehicle. This action may be manual, for example initiated by its user, or automatic.

Once this or these conditions are no longer detected, the minimum power is again used as the minimum value for the electric power actually supplied by the storage device.

Noted that all or part of the steps, in particular S5 and S6, may take place simultaneously and/or be repeated over time, for example at regular intervals.

In addition, the operation of the assembly ENS and the management device GES according to the above principle of maximum powers may be implemented as a specific operating mode of the assembly ENS and management device GES. This operating mode is selectively actuatable, and is advantageously chosen among a plurality of possible operating modes.

For example, in one of these operating modes, the control module CONT does not take into account the maximum power Pmax(i), or the determination module DET does not determine the power Pmax(i).

The invention offers several advantages.

Indeed, it makes it possible to ensure a disclaiming of the storage deuce in a manner compatible with prolonged use of the assembly ENS. In addition, this is achieved without the user needing to monitor the charge state of the storage device.

In addition, it prevents under-utilization of the storage device, which is undesirable, especially in case of a route that mostly tends to climb.

Note that this description can be immediately transposed to a configuration in which the invention relates to a vehicle other than a bicycle, for example a motor vehicle.

In such a configuration, the elements placed at or near the handlebars of the bicycle are for example in the dashboard of the vehicle or in a computer that it comprises. In addition, the assembly ENS, in particular the motor, provides propulsion of the vehicle for example by action for example on an axle of the vehicle, and not on a pedal thereof.

In addition, the propulsion of the vehicle is advantageously obtained in whole or in part from a motor of a type other than electrical, for example thermal.

Furthermore, in the context of the invention, the various elements described above, namely the management device GES, the assembly ENS, and their respective components, define functionalities that can be distributed over the vehicle in any manner.

In general, regardless of the embodiment considered, they are adapted to communicate with each other via communication means such as for example the communication interface COM. For example, they are interconnected by means of one or more wired communication buses, and/or a w ireless local area network. This network relies for example on WiFi technology. Bluetooth, or a PAN type of technology ("Personal Area Network").

Furthermore, in the above description, the management device GES is described as corresponding to a physical device in its own right.

However, alternatively, the management device GES is integrated with another electronic device such as a smart mobile phone.

In this configuration, the determination module DET is for example in the form of a software module contained in the memory MEM, which is a memory of this electronic device. The determination module DET is then for example implemented by execution by a processing component of this device, such as a processor. The communication interface is then for example a communication interface of this device.

In the case where the vehicle is a car, this electronic device corresponds for example to an onboard computer.

The invention claimed is:

1. A management device configured to manage an electric propulsion assembly of a vehicle, the electric propulsion assembly including an electrical energy storage device and a motor configured to propel the vehicle entirely or partially using electrical energy stored in the electrical energy storage device, the management device comprising:
   a communication interface configured to receive an elevation profile of a predetermined route that the vehicle is intended to take;
   one or more processors configured to divide the route into a plurality of segments based on the elevation profile and configured to determine, based on said elevation profile, for each of the segments of said route, a maximum electric power that the electrical energy storage device is configured to supply to the motor to the corresponding segment, each of the segments being associated with the maximum electric power,
   wherein the management device is configured to interact with the electric propulsion assembly such that, for each of the segments of the route, the electric power actually supplied by the electrical energy storage device to the motor is less than the corresponding maximum electric power, and in order to determine the maximum electric power for one or more of the segments of the route, the one or more processors is configured to determine, for each of the segments and from the elevation profile, a type of segment from one of: a climbing segment, a descending segment, and a flat segment, define, for the route, an energy budget determined according to the electrical energy storage device, and define, for each of the segments, a portion of the energy budget, when the value of a combination of: (i) terms respectively associated with one of the segments, each of the terms corresponding to a product of the energy budget portion for the respective segment, and (ii) a factor determined according to the determined type of the respective segment is greater than the energy budget, recalculate the value of said combination, for each of one or more iterations between each of which the energy budget portion for each of the segments is reduced by a predetermined value relative to the previous iteration, until the value of the combination is less than or equal to the energy budget, and determine the maximum electric power of the one or more of the segments, based on the product of the energy budget portion and the factor determined for the respective segment that provided the value of the combination less than or equal to the energy budget.

2. The management device according to claim 1, wherein, for a specific segment of the plurality of segments, the associated maximum electric power is representative of the electrical energy available for the segment, the management device being configured to interact with the electric propulsion assembly such that the electrical energy actually supplied to the motor in a segment by the electrical energy storage device is greater than or equal to a predetermined fraction of the electrical energy available for the segment.

3. The management device according to claim 1, wherein the one or more processors is configured to determine the maximum electric power of at least one of the segments based on the ratio between: an electrical energy corresponding to the product of the energy budget portion and the factor chosen for the respective segment providing the value of the combination less than or equal to the energy budget, and an estimate of a time needed for the vehicle to travel all or part of the respective segment.

4. The management device according to claim 3, wherein the one or more processors is configured to determine the estimate from at least one vehicle speed information item provided by a positioning module comprised in the management device or with which the management device is configured to communicate via the communication interface.

5. The management device according to claim 1, wherein the one or more processors is configured to select the factor for a climbing or descending segment from at least two distinct values corresponding to different respective levels of elevation changes.

6. The management device according to claim 1, wherein the type of the respective segment is determined based on the difference between the altitude of a starting point of the respective segment and the altitude of an end point of the respective segment.

7. The management device according to claim 1, wherein the determination module is configured to divide the route into the segments that have respective monotonic elevation profiles.

8. The management device according to claim 1, wherein the energy budget portions respectively associated with the respective segments are identical between segments.

9. The management device according to claim 1, wherein the energy budget portion associated with the respective segment is determined from a length of the respective segment relative to a length of the route.

10. The management device according to claim 1, further comprising a memory configured to store, for said route, the determined maximum electric powers, the one or more processors being configured to reuse all or part of the maximum electric powers contained in the memory for one or more of the segments of said route for a subsequent trip by the vehicle on said route.

11. The management device according to claim 1, wherein said management device is integrated with a portable electronic device.

12. A method for managing an electric propulsion assembly of a vehicle, the electric propulsion assembly including an electrical energy storage device and a motor configured to propel said vehicle entirely or partially using electrical energy stored in the electrical energy storage device, the method being implemented by a computer, the method comprising:

receiving an elevation profile for a predetermined route that the vehicle is intended to follow;

dividing the route into a plurality of segments based on the elevation profile;

determining, based on said elevation profile, for each of the segments of said route, a maximum electric power that the electrical energy storage device is configured to supply to the motor to the associated segment;

interacting with the electric propulsion assembly such that, for each of the segments of the route, the electric power actually supplied by the electrical energy storage device to the motor is less than the corresponding maximum electric power; and in order to determine the maximum electric power for one or more of the segments of the route, determining, for each of the segments and from the elevation profile, a type of segment from one of: a climbing segment, a descending segment, and a flat segment;

defining, for the route, an energy budget determined according to the electrical energy storage device, and defining, for each of the segments, a portion of the energy budget;

when the value of a combination of: (i) terms respectively associated with one of the segments, each of the terms corresponding to a product of the energy budget portion for the respective segment, and (ii) a factor determined according to the determined type of the respective segment is greater than the energy budget, recalculating the value of said combination, for each of one or more iterations between each of which the energy budget portion for each of the segments is reduced by a predetermined value relative to the previous iteration, until the value of the combination is less than or equal to the energy budget; and determining the maximum electric power of the one or more of the segments, based on the product of the energy budget portion and the factor determined for the respective segment that provided the value of the combination less than or equal to the energy budget.

13. A non-transitory computer-readable medium on which is stored a computer program comprising instructions for implementing the method according to claim 12, when the program is executed by a processor.

14. The management device according to claim 3, wherein the one or more processors is configured to select the factor for a climbing or descending segment from at least two distinct values corresponding to different respective levels of elevation changes.

15. The management device according to claim 4, wherein the one or more processors is configured to select the factor for a climbing or descending segment from at least two distinct values corresponding to different respective levels of elevation changes.

16. The management device according to claim 3, wherein the type of the respective segment is determined based on the difference between the altitude of a starting point of the respective segment and the altitude of an end point of the respective segment.

17. The management device according to claim 4, wherein the type of the respective segment is determined based on the difference between the altitude of a starting point of the respective segment and the altitude of an end point of the respective segment.

18. The management device according to claim 5, wherein the type of the respective segment is determined based on the difference between the altitude of a starting point of the respective segment and the altitude of an end point of the respective segment.

* * * * *